(12) United States Patent
Kitagawa et al.

(10) Patent No.: US 11,365,805 B2
(45) Date of Patent: Jun. 21, 2022

(54) CONTROL DEVICE FOR VEHICLE AND CONTROL METHOD FOR VEHICLE

(71) Applicants: JATCO Ltd, Fuji (JP); NISSAN MOTOR CO., LTD., Yokohama (JP)

(72) Inventors: Seiya Kitagawa, Isehara (JP); Tomoaki Honma, Isehara (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 82 days.

(21) Appl. No.: 16/636,495

(22) PCT Filed: Jul. 30, 2018

(86) PCT No.: PCT/JP2018/028494
§ 371 (c)(1),
(2) Date: Feb. 4, 2020

(87) PCT Pub. No.: WO2019/031293
PCT Pub. Date: Feb. 14, 2019

(65) Prior Publication Data
US 2020/0248802 A1   Aug. 6, 2020

(30) Foreign Application Priority Data

Aug. 9, 2017  (JP) .............................. JP2017-154530

(51) Int. Cl.
*F16H 59/18*   (2006.01)
*F16H 59/46*   (2006.01)
(Continued)

(52) U.S. Cl.
CPC .......... *F16H 61/6645* (2013.01); *F16H 59/18* (2013.01); *F16H 59/40* (2013.01); *F16H 59/46* (2013.01); *F16H 2059/147* (2013.01)

(58) Field of Classification Search
CPC ...... B60W 10/02; B60W 10/10; B60W 10/11; B60W 10/06; B60W 20/30; F16H 59/18;
(Continued)

(56) References Cited

U.S. PATENT DOCUMENTS 5,944,765 A * 8/1999 Saito ..................... B60W 30/18
701/54
2011/0015033 A1* 1/2011 Nonomura ............ F16H 61/702
477/37
(Continued)

FOREIGN PATENT DOCUMENTS

WO  WO-2015/146451 A1  10/2015

*Primary Examiner* — Ernesto A Suarez
*Assistant Examiner* — Lillian T Nguyen
(74) *Attorney, Agent, or Firm* — Foley & Lardner LLP

(57) ABSTRACT

A vehicle includes a transmission having a variator and a sub-transmission mechanism, a controller serving as a shift control unit adapted to, as shift of the transmission, shift the sub-transmission mechanism and the variator so that a through speed ratio becomes a target speed ratio, and an engine serving as a torque increasing portion adapted to increase a torque inputted to the transmission in association with the shift of the transmission. The controller has a torque setting unit adapted to make a magnitude of an inclination larger as an increase amount of the engine rotation speed in association with the shift of the transmission is larger.

7 Claims, 6 Drawing Sheets

(51) Int. Cl.
    *F16H 61/664*     (2006.01)
    *F16H 59/40*     (2006.01)
    *F16H 59/14*     (2006.01)

(58) Field of Classification Search
    CPC ... F16H 61/662; F16H 61/6645; B60K 6/547; B60K 6/543
    See application file for complete search history.

(56) References Cited

U.S. PATENT DOCUMENTS

2016/0223080 A1*   8/2016  Inoue .................... F16H 37/021
2017/0021834 A1    1/2017  Tohta

* cited by examiner

CONTROL DEVICE FOR VEHICLE AND CONTROL METHOD FOR VEHICLE

CROSS-REFERENCE TO RELATED APPLICATIONS

The present application claims priority to Japanese Patent Application No. 2017-154530 filed on Aug. 9, 2017, the entire contents of which are hereby incorporated by reference.

TECHNICAL FIELD

The present invention relates to a control device for a vehicle and a control method for a vehicle.

BACKGROUND ART

WO2015/146451 discloses a technique of, at the time of shifting from a first-speed gear position to a second-speed gear position in a sub-transmission mechanism, by increasing engine torque more than basic engine torque, suppressing a decrease in vehicle front-rear acceleration occurring at this time, that is, suppressing temporarily negative vehicle front-rear acceleration. In the technique of WO2015/146451, upon increasing the engine torque, an upshift amount of a through speed ratio which is an overall speed ratio of the sub-transmission mechanism and a continuously variable transmission mechanism is not brought into question.

SUMMARY OF INVENTION

The decrease in the vehicle front-rear acceleration also occurs at the time of downshift of a stepped automatic transmission mechanism. The magnitude of the decrease in the vehicle front-rear acceleration at this time is differentiated depending on a downshift amount of the through speed ratio. Therefore, when the torque is increased while not bringing the downshift amount of the through speed ratio into question, the torque is not properly increased. As a result, there is a possibility that the decrease in the vehicle front-rear acceleration cannot properly be suppressed.

The present invention is achieved in consideration with such a technical problem, and an object of the present invention is to provide a control device for a vehicle and a control method for a vehicle with which a decrease in vehicle front-rear acceleration can properly be suppressed at the time of downshift of a stepped automatic transmission mechanism.

A control device for a vehicle according to a certain aspect of the present invention is a control device adapted to perform control in the vehicle having a transmission having a variator and a stepped automatic transmission mechanism which are arranged in series with respect to each other in a power transmission route connecting a travel drive source and a drive wheel, a shift control unit adapted to, as shift of the transmission, shift the stepped automatic transmission mechanism and the variator so that a speed ratio of the transmission becomes a target speed ratio, and a torque increasing portion adapted to increase torque inputted to the transmission in association with the shift of the transmission. The control device includes a torque setting unit adapted to make an increase degree of the torque inputted to the transmission larger as an increase amount of rotation speed of the torque increasing portion in association with the shift of the transmission is larger.

According to another aspect of the present invention, a control method for a vehicle is provided. The vehicle has a transmission having a variator and a stepped automatic transmission mechanism which are arranged in series with respect to each other in a power transmission route connecting a travel drive source and a drive wheel, and a torque increasing portion adapted to increase torque inputted to the transmission in association with shift of the transmission. The method for the vehicle is a method in a case where, as the shift of the transmission, the stepped automatic transmission mechanism and the variator are shifted so that a speed ratio of the transmission becomes a target speed ratio. The control method includes of making an increase degree of the torque inputted to the transmission larger as an increase amount of rotation speed of the torque increasing portion in association with the shift of the transmission is larger.

According to these aspects, in the context that with a larger downshift amount of a through speed ratio, there is a need for more largely increasing the rotation speed of the torque increasing portion such as an engine, the increase degree of the torque inputted to the transmission is changed in accordance with the increase amount of the rotation speed of the torque increasing portion. Therefore, at the time of the downshift of the stepped automatic transmission mechanism, by changing the increase degree of the torque inputted to the transmission in accordance with the magnitude of a possibly occurring decrease in vehicle front-rear acceleration, it is possible to properly suppress the decrease in the vehicle front-rear acceleration.

DESCRIPTION OF EMBODIMENTS

Hereinafter, an embodiment of the present invention will be described with reference to the attached drawings.

Figure 1:
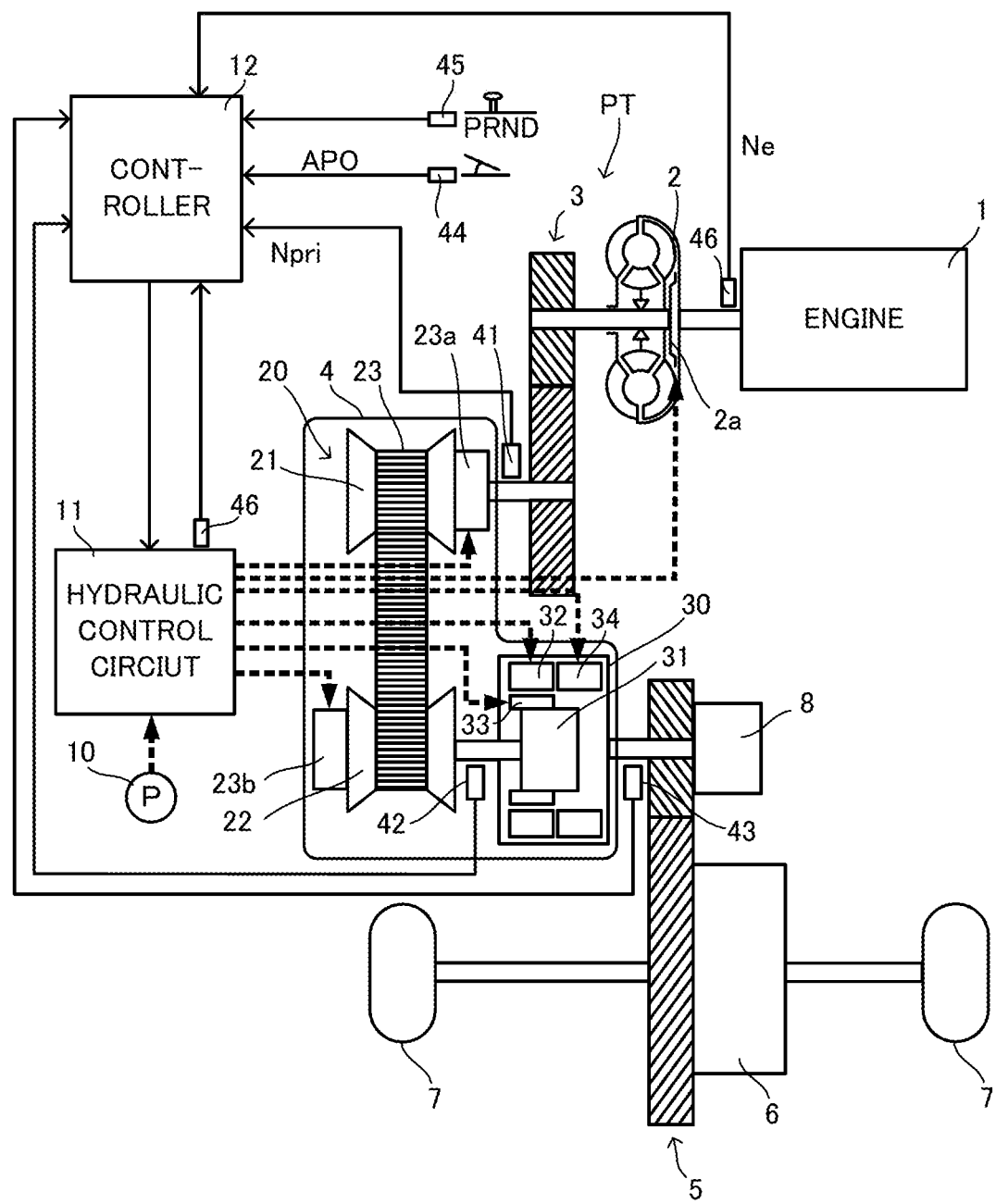
FIG. 1 is a schematic configuration diagram of a vehicle.

FIG. 1 is a schematic configuration diagram of a vehicle. An engine 1 is a travel drive source for the vehicle and generates engine torque Te as a torque source. Motive power of the engine 1 is transmitted to drive wheels 7 via a torque converter 2, a first gear train 3, a transmission 4, a second gear train 5, and a differential device 6 which form a powertrain PT. A parking mechanism 8 adapted to mechanically non-rotatably lock an output shaft of the transmission 4 at the time of parking is provided in the second gear train 5.

The torque converter 2 includes a lock-up clutch 2a. When the lock-up clutch 2a is engaged, slippage in the torque converter 2 is eliminated, and transmission efficiency of the torque converter 2 is improved.

The transmission 4 is a continuously variable transmission including a variator 20. The variator 20 is a continuously variable transmission mechanism including a pulley 21 serving as a primary pulley, a pulley 22 serving as a secondary pulley, and a belt 23 looped over the pulleys 21, 22. The pulley 21 forms a driving side rotation element, and the pulley 22 forms a driven side rotation element.

Each of the pulleys 21, 22 includes a fixed conical plate, a movable conical plate arranged in a state where a sheave surface opposes the fixed conical plate, the movable conical plate forming a V groove with the fixed conical plate, and a hydraulic cylinder provided on a back surface of the movable conical plate, the hydraulic cylinder being adapted to displace the movable conical plate in the axial direction. The pulley 21 includes a hydraulic cylinder 23a as the hydraulic cylinder, and the pulley 22 includes a hydraulic cylinder 23b as the hydraulic cylinder.

When oil pressure supplied to the hydraulic cylinder 23a or 23b is adjusted, width of the V groove is changed and a contact radius between the belt 23 and the pulley 21 or 22 is changed, so that a speed ratio of the variator 20 is continuously changed.

The transmission 4 further includes a sub-transmission mechanism 30. The sub-transmission mechanism 30 is a transmission mechanism having two forward gear positions and one reverse gear position, and has a first-speed gear position and a second-speed gear position whose speed ratio is smaller than the first-speed gear position as the forward gear positions. The sub-transmission mechanism 30 is provided in series with respect to the variator 20 in a power transmission route connecting the engine 1 and the drive wheels 7. The sub-transmission mechanism 30 is provided on the output side of the variator 20.

The sub-transmission mechanism 30 may be directly connected to an output shaft of the variator 20 as in this example, or may be connected via other power transmission mechanisms such as shift or a gear train. Alternatively, the sub-transmission mechanism 30 may be connected to the input shaft side of the variator 20. The sub-transmission mechanism 30 may have gear positions more than three forward gear positions.

In the vehicle, in each of the variator 20 and the sub-transmission mechanism 30, the speed ratio is changed. Therefore, in the vehicle, shift is performed in accordance with an overall speed ratio of the variator 20 and the sub-transmission mechanism 30, that is, a through speed ratio Ratio_T serving as a speed ratio of the transmission 4. The through speed ratio Ratio_T is a speed ratio obtained by multiplying the speed ratio of the variator 20 by the speed ratio of the sub-transmission mechanism 30. The variator 20 and the sub-transmission mechanism 30 may be formed as structurally individual transmission mechanisms.

The sub-transmission mechanism 30 specifically includes a planetary gear mechanism 31, and plural friction engaging elements including a low brake 32, a high clutch 33, and a rev brake 34. The gear position of the sub-transmission mechanism 30 is changed by adjusting oil pressure supplied to the plural friction engaging elements and changing an engaged/disengaged state of the plural friction engaging elements.

For example, when the low brake 32 is engaged and the high clutch 33 and the rev brake 34 are disengaged, the gear position is the first-speed gear position. When the high clutch 33 is engaged and the low brake 32 and the rev brake 34 are disengaged, the gear position is the second-speed gear position. When the rev brake 34 is engaged and the low brake 32 and the high clutch 33 are disengaged, the gear position is the reverse gear position.

A change in the gear position of the sub-transmission mechanism 30 is executed on the basis of vehicle speed VSP and an accelerator pedal opening APO. The change in the gear position of the sub-transmission mechanism 30 is formed by four phases including a preparation phase, a torque phase, an inertia phase, and an ending phase.

In the preparation phase, the oil pressure is pre-charged to the engaged-side friction engaging element, and the engaged-side friction engaging element is set standby in an immediately-before-engaged state.

In the torque phase, the oil pressure supplied to the disengaged-side friction engaging element is decreased and the oil pressure supplied to the engaged-side friction engaging element is increased. Thus, the friction engaging element responsible for torque transmission is shifted from the disengaged-side friction engaging element to the engaged-side friction engaging element.

In the inertia phase, the speed ratio is changed from a speed ratio of a pre-shift gear position to a speed ratio of a post-shift gear position.

In the ending phase, the oil pressure supplied to the disengaged-side friction engaging element is brought to be zero in gauge pressure, so that the disengaged-side friction engaging element is completely disengaged, and the oil pressure supplied to the engaged-side friction engaging element is increased, so that the engaged-side friction engaging element is completely engaged.

The four phases occur generally in this order. However, in upshift occurring in a case where a driver lets his/her foot off an acceleration pedal or downshift occurring in a case where the driver presses the accelerator pedal, the order of the torque phase and the inertia phase is reversed.

The vehicle further includes an oil pump 10, a hydraulic control circuit 11, and a controller 12.

The oil pump 10 pressure-feeds oil to the hydraulic control circuit 11. For example, a mechanical oil pump to be driven by utilizing part of the motive power of the engine 1 can be used as the oil pump 10. The hydraulic control circuit 11 is formed by plural flow passages and plural hydraulic control valves, and adjusts the oil pressure generated by supplying the oil by the oil pump 10 and supplies to portions of the transmission 4 and the lock-up clutch 2a. The controller 12 is a transmission controller and controls the hydraulic control circuit 11.

Output signals of a rotation sensor 41, a rotation sensor 42, and a rotation sensor 43 are inputted to the controller 12. The rotation sensor 41 is a variator input side rotation sensor for detecting rotation speed on the input side of the variator 20. The rotation sensor 42 is a variator output side rotation sensor for detecting rotation speed on the output side of the variator 20. The rotation sensor 42 specifically detects rotation speed on the output side of the variator 20 and on the input side of the sub-transmission mechanism 30. The rotation sensor 43 is a sub-transmission mechanism output side rotation sensor for detecting rotation speed on the output side of the sub-transmission mechanism 30.

The rotation speed on the input side of the variator 20 is specifically rotation speed Npri of the input shaft of the variator 20. The rotation speed on the input side of the variator 20 may be rotation speed at a position in the power transmission route described above, for example, with a gear train being placed between the variator 20 and the position. The same applies to the rotation speed on the output side of the variator 20 and the rotation speed on the output side of the sub-transmission mechanism 30.

In addition, output signals of an accelerator pedal opening sensor 44, an inhibitor switch 45, an engine rotation sensor 46, etc. are further inputted to the controller 12. The accelerator pedal opening sensor 44 detects an operation amount of the accelerator pedal, therefore, the accelerator pedal opening APO representing an acceleration request of the driver. The inhibitor switch 45 detects a position of a selector lever. The engine rotation sensor 46 detects engine rotation speed Ne serving as rotation speed of the engine 1. The controller 12 can detect the vehicle speed VSP on the basis of the output signal of the rotation sensor 43.

The controller 12 generates shift control signals on the basis of these signals, and outputs the generated shift control signals to the hydraulic control circuit 11. The hydraulic control circuit 11 controls the plural hydraulic control valves on the basis of the shift control signals from the controller 12, and switches a hydraulic supply route. The hydraulic control circuit 11 also adjusts required oil pressure from the oil pressure generated by supplying the oil by the oil pump 10, and supplies the adjusted oil pressure to the portions of the transmission 4 and the lock-up clutch 2a. Thereby, shift of the variator 20, the change in the gear position of the sub-transmission mechanism 30, and engagement and disengagement of the lock-up clutch 2a are performed.

Figure 2:
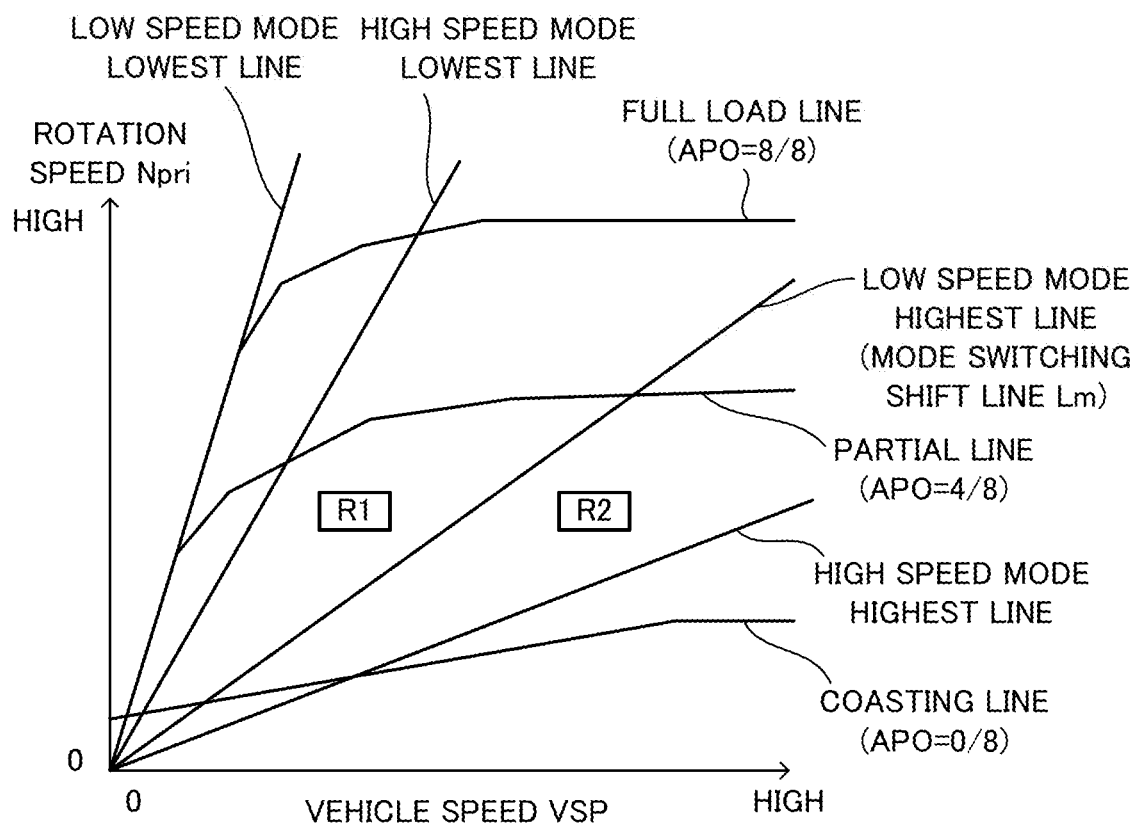
FIG. 2 is a diagram showing an example of a shift map.

FIG. 2 is a diagram showing an example of a shift map. FIG. 2 shows, as shift lines, a full load line serving as a shift line when the accelerator pedal opening APO is equal to 8/8, a partial line serving as a shift line when the accelerator pedal opening APO is equal to 4/8, and a coasting line serving as a shift line when the accelerator pedal opening APO is equal to zero.

Shift of the transmission 4 is performed on the basis of the shift map. The shift map shows operation points of the transmission 4 in accordance with the vehicle speed VSP and the rotation speed Npri.

The shift of the transmission 4 is performed in line with the shift line selected in accordance with the accelerator pedal opening APO. Therefore, a shift line is set for each accelerator pedal opening APO in the shift map. In the shift map, the speed ratio of the transmission 4, that is, the through speed ratio Ratio_T is indicated by inclination of a line connecting the operation point of the transmission 4 and the zero point of the shift map.

In a case where the gear position of the sub-transmission mechanism 30 is the first-speed gear position, the shift of the transmission 4 can be performed between a low speed mode lowest line obtained by maximizing the speed ratio of the variator 20 and a low speed mode highest line obtained by minimizing the speed ratio of the variator 20.

In a case where the gear position of the sub-transmission mechanism 30 is the second-speed gear position, the shift of the transmission 4 can be performed between a high speed mode lowest line obtained by maximizing the speed ratio of the variator 20 and a high speed mode highest line obtained by minimizing the speed ratio of the variator 20.

In the shift map, a mode switching shift line Lm with which shift of the sub-transmission mechanism 30 is performed is further set. In this example, the mode switching shift line Lm is set to be the low speed mode highest line. A region R1 indicates a region on the lower vehicle speed VSP side with respect to the mode switching shift line Lm, and a region R2 indicates a region on the higher vehicle speed VSP side with respect to the mode switching shift line Lm.

In a case where the operation point of the transmission 4 crosses the mode switching shift line Lm, the controller 12 performs the shift of the sub-transmission mechanism 30. In association with the shift of the sub-transmission mechanism 30, the controller 12 performs cooperative shift in which the speed ratio of the variator 20 is changed in the direction opposite to the direction in which the speed ratio of the sub-transmission mechanism 30 is changed so that the through speed ratio Ratio_T becomes a target speed ratio Ratio_T2.

Specifically, in a case where the operation point of the transmission 4 crosses the mode switching shift line Lm from the region R1 toward the region R2, the controller 12 starts 1-2 shift in which the gear position of the sub-transmission mechanism 30 is upshifted from the first-speed gear position to the second-speed gear position. In this case, the controller 12 specifically performs the cooperative shift in which the speed ratio of the variator 20 is changed in the direction in which the speed ratio is increased, that is, to the low side. In the cooperative shift, the shift of the sub-transmission mechanism 30 may also be included.

2-1 shift in which the gear position of the sub-transmission mechanism 30 is downshifted from the second-speed gear position to the first-speed gear position is performed in accordance with an accelerator pedal operation or a selector lever operation of the driver. For example, in the 2-1 shift performed in accordance with pressing of the accelerator pedal, the operation point is moved from the region R2 to the region R1 toward the upper side in the figure. Thus, the rotation speed Npri is increased. In a case where the 2-1 shift is performed, in the variator 20, it is possible to perform the shift in which the speed ratio is changed in the direction in which the speed ratio is decreased, that is, to the high side.

At the time of downshift of the sub-transmission mechanism 30, a decrease in acceleration G serving as vehicle front-rear acceleration, that is, temporarily negative acceleration G may occur. This is due to generation of inertia torque in the engine 1 when an increase in the engine rotation speed Ne is started by an increase in the rotation speed Npri.

The magnitude of the decrease in the acceleration G at this time is differentiated depending on a downshift amount of the through speed ratio Ratio_T. This is because when the 2-1 shift is performed but, for example, an upshift amount of the variator 20 is large and the downshift amount of the through speed ratio Ratio_T is small, the increase in the rotation speed Npri is also small.

Therefore, when the engine torque Te is increased and the torque is increased while not bringing the downshift amount of the through speed ratio Ratio_T into question, the torque is not properly increased. As a result, there is a concern that the decrease in the acceleration G cannot properly be suppressed.

In consideration with such a circumstance, the controller 12 performs control to be described next in the present embodiment.

Figure 3:
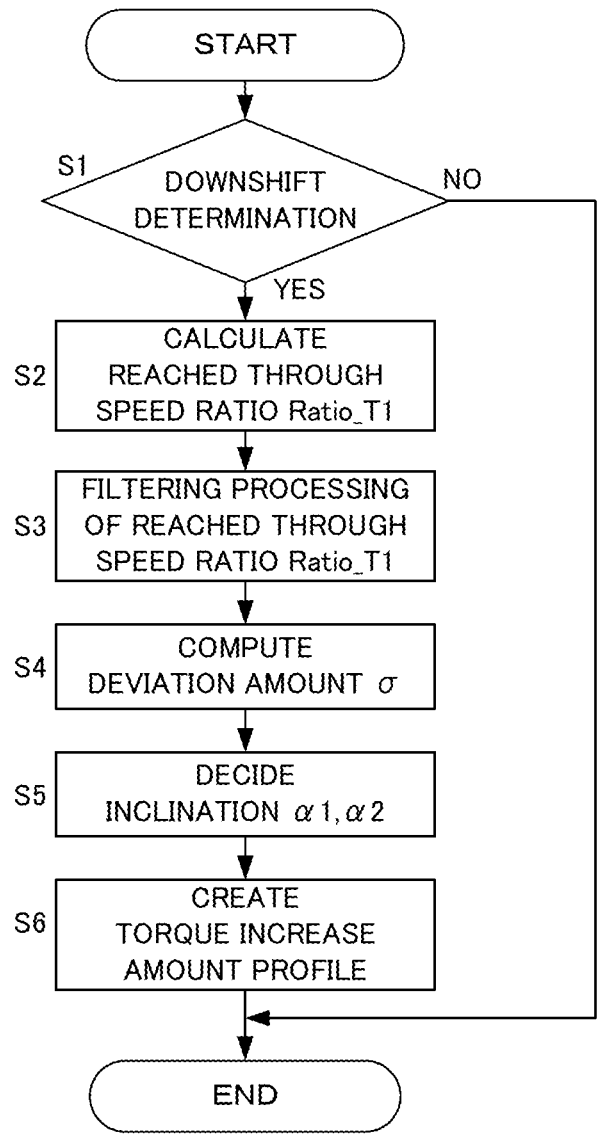
FIG. 3 is a diagram showing an example of control of an embodiment in a flowchart.

FIG. 3 is a diagram showing an example of the control to be performed by the controller 12 in a flowchart. In order to perform processing of the present flowchart, the controller 12 has a shift control unit and a torque setting unit.

In Step S1, the controller 12 performs downshift determination of the sub-transmission mechanism 30. The downshift determination of the sub-transmission mechanism 30 is to determine whether or not the downshift of the sub-transmission mechanism 30 is started, in other words, whether or not the inertia phase of the sub-transmission mechanism 30 is started. The downshift determination can be performed on the basis of outputs of the rotation sensor 42 and the rotation sensor 43. When NO determination is provided in Step S1, the processing is ended once. When YES determination is provided in Step S1, the processing is advanced to Step S2.

In Step S2, the controller 12 calculates a reached through speed ratio Ratio_T1. The reached through speed ratio Ratio_T1 can be calculated by reading the corresponding speed ratio from the shift map on the basis of the accelerator pedal opening APO and the vehicle speed VSP.

In Step S3, the controller 12 performs filtering processing of the reached through speed ratio Ratio_T1. The filtering processing can be performed by, for example, a primary low-pass filter. The reached through speed ratio Ratio_T1 after the filtering processing is the target speed ratio Ratio_T2.

Therefore, the controller 12 performs shift control to shift the sub-transmission mechanism 30 and the variator 20 so that the through speed ratio Ratio_T becomes such a target speed ratio Ratio_T2 as the shift of the transmission 4.

In the controller 12, the reached through speed ratio Ratio_T1 is inputted to the filter, and also inputted to a computing unit adapted to compute a deviation amount σ between the reached through speed ratios Ratio_T1 before and after the filtering processing while bypassing the filter.

In Step S4, the controller 12 computes the deviation amount σ. The deviation amount σ can be obtained by subtracting the reached through speed ratio Ratio_T1 after the filtering processing calculated in Step S3, that is, the target speed ratio Ratio_T2 from the reached through speed ratio Ratio_T1 before the filtering processing calculated in Step S2.

In Step S5, the controller 12 decides inclination α1 and inclination α2 on the basis of the deviation amount σ. The inclination α1 is inclination of a change in the engine torque Te at the time of starting to increase the torque and indicates an increase degree of the torque inputted to the transmission 4 at the time of starting to increase the torque. The inclination α2 is inclination of a change in the engine torque Te at the time of ending to increase the torque and indicates a decrease degree of the torque inputted to the transmission 4 at the time of ending to increase the torque by an absolute value. The inclination α1 is set in advance by map data, etc. in accordance with the deviation amount σ as follows. The same applies to the inclination α2.

Figure 4:
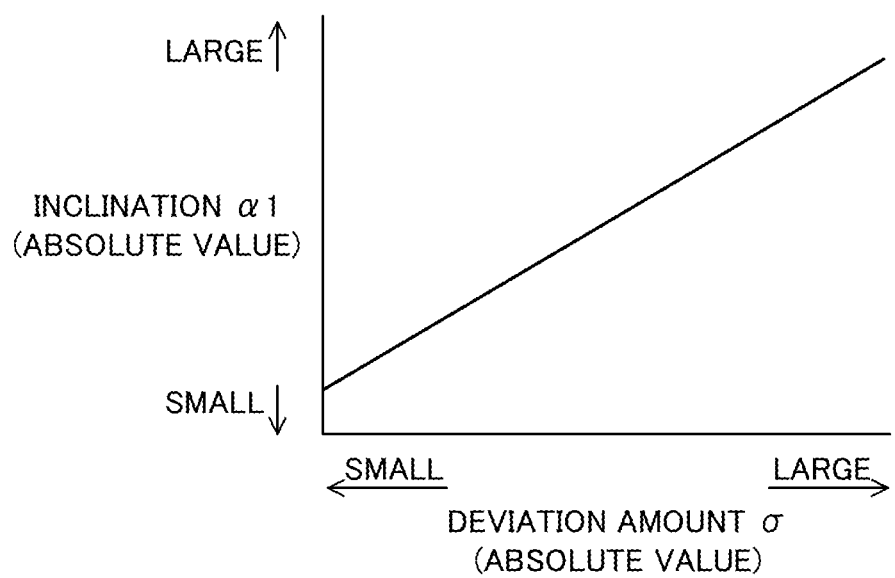
FIG. 4 is a diagram showing a relationship between a deviation amount and inclination.

FIG. 4 is a diagram showing a relationship between the deviation amount σ and the inclination α1. In FIG. 4, a change in the inclination α1 in accordance with the deviation amount σ is shown as a tendency. As shown in FIG. 4, the deviation amount σ and the inclination α1 are set so that the inclination α1 is smaller as the deviation amount σ is smaller by absolute values. This is because as the downshift amount is smaller, a change in the through speed ratio Ratio_T is gentler and the magnitude of the possibly occurring decrease in the acceleration G is smaller.

Returning to FIG. 3, in Step S6, the controller 12 creates a torque increase amount profile. The decided inclination α1 and the decided inclination α2 are reflected on the created torque increase amount profile. The created torque increase amount profile is inputted to an engine controller adapted to control the engine 1. Under control of the engine controller, the engine 1 increases the torque. After Step S6, the processing is ended once.

Figure 5A:
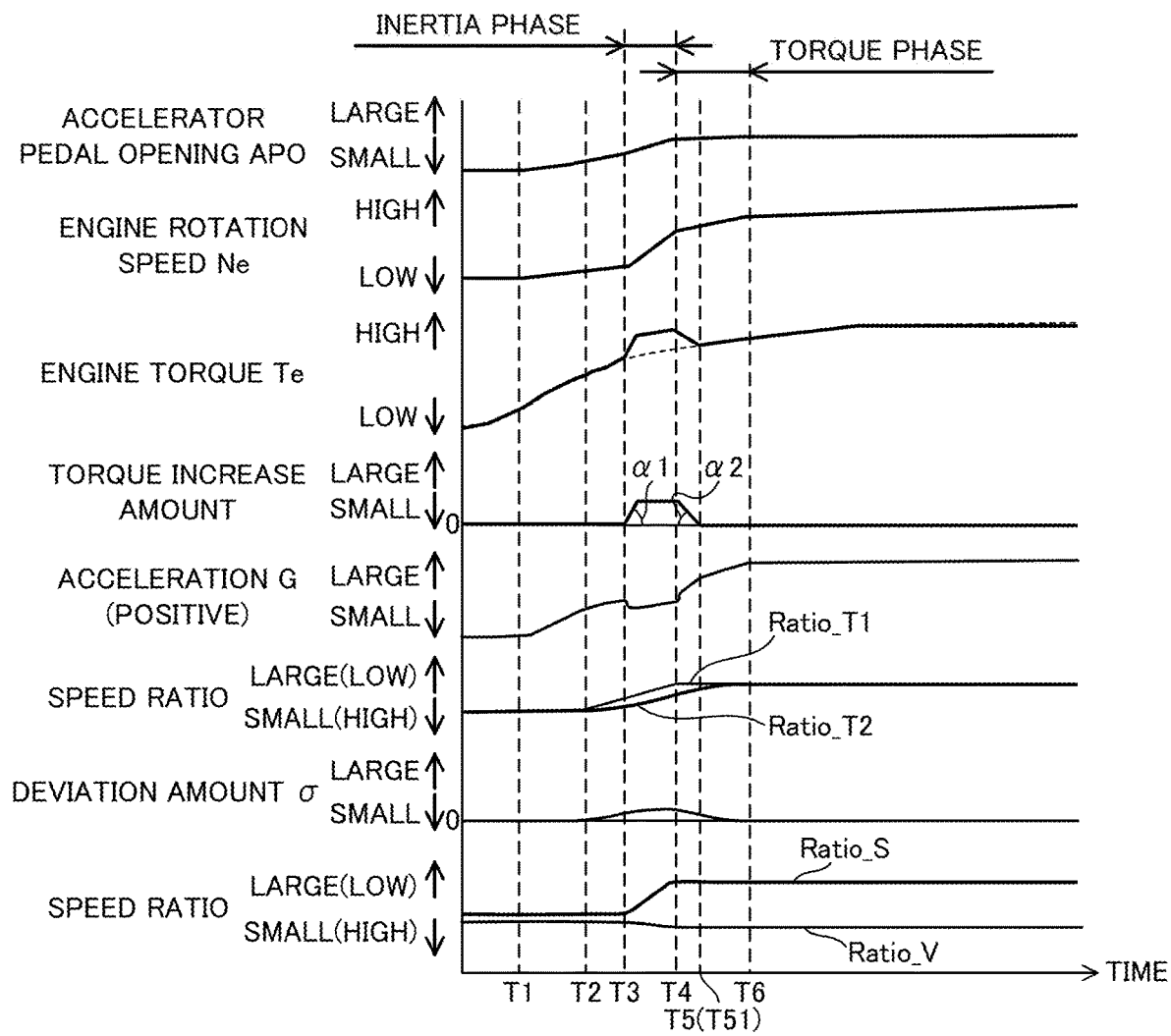
FIG. 5A is a diagram showing a first example of a timing chart corresponding to the control of the embodiment.
Figure 5B:
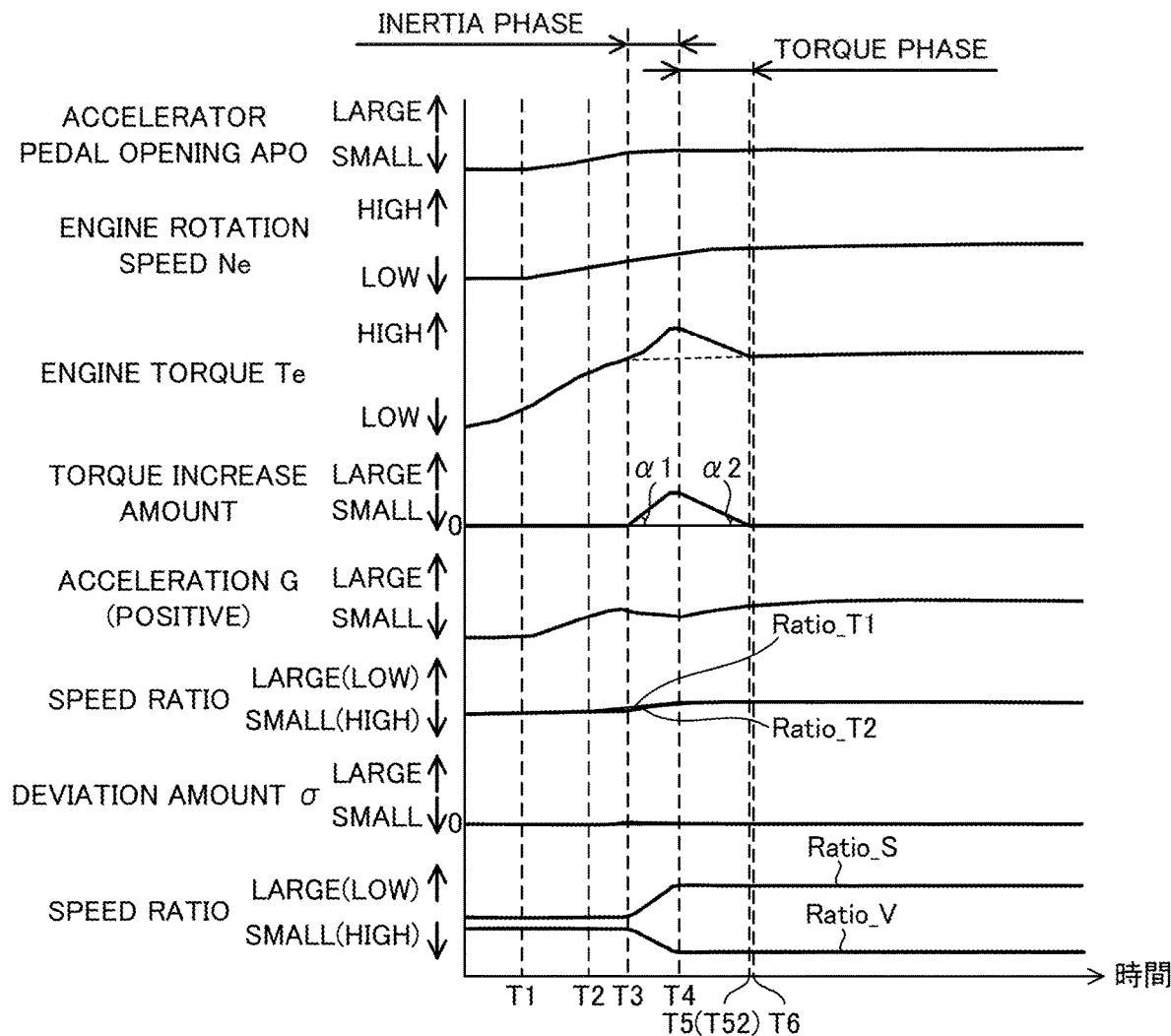
FIG. 5B is a diagram showing a second example of the timing chart corresponding to the control of the embodiment.

Each of FIGS. 5A, 5B is a diagram showing an example of a timing chart corresponding to the flowchart shown in FIG. 3. FIG. 5A shows a first example, and FIG. 5B shows a second example. The first example shows a case where the upshift amount of the variator 20 in association with the 2-1 shift is small, and therefore, a case where the downshift amount of the through speed ratio Ratio_T is large. The second example shows a case where the upshift amount of the variator 20 in association with the 2-1 shift is large, and therefore, a case where the downshift amount of the through speed ratio Ratio_T is small. A speed ratio Ratio_V indicates the speed ratio of the variator 20, and a speed ratio Ratio_S indicates the speed ratio of the sub-transmission mechanism 30.

In both the first example and the second example, the accelerator pedal opening APO and the engine rotation speed Ne are fixed and the engine torque Te is increased before timing T1. At the timing T1, an increase in the accelerator pedal opening APO is started and in accordance with this, the increase in the engine rotation speed Ne and the acceleration G is also started.

Timing T2 is timing at which an increase in the reached through speed ratio Ratio_T1 is started. An increase in the target speed ratio Ratio_T2 is started behind the increase in the reached through speed ratio Ratio_T1. Therefore, an increase in the deviation amount σ is started from the timing T2 and later.

Timing T3 is timing at which the inertia phase of the 2-1 shift of the sub-transmission mechanism 30 is started. At the timing T3, upshift of the variator 20 is started.

As clear from a change in the speed ratio Ratio_V from the timing T3 and later, in the first example, the upshift amount of the variator 20 is smaller than in the second example. Therefore, as clear from a change in the reached through speed ratio Ratio_T1 and the target speed ratio Ratio_T2, in the first example, the downshift amount of the through speed ratio Ratio_T is larger than in the second example.

As the downshift amount of the through speed ratio Ratio_T is larger, a required increase amount of the engine rotation speed Ne is larger, and the magnitude of the possibly occurring decrease in the acceleration G is also larger. Therefore, in the first example, the inclination α1 is larger than in the second example. As a result, in the first example, the torque is increased more quickly than in the second example. The torque increase amount profile is created on the basis of the deviation amount σ at the timing T3. A change in a torque increase amount between the timing T3 and timing T5 indicates the torque increase amount profile.

From the timing T3 and later, an increase in the torque of the engine 1 based on the created torque increase amount profile is started, and an increase in the torque increase amount is started. As a result, the engine torque Te is increased in accordance with the increase in the torque increase amount. Regarding the engine torque Te, a broken line indicates a case where the torque of the engine 1 is not increased.

Timing T4 is timing at which the inertia phase is ended and the torque phase is started. At the timing T4, the downshift of the sub-transmission mechanism 30 and the upshift of the variator 20 are completed.

The decrease in the acceleration G due to the shift of the sub-transmission mechanism 30 no more occurs once the inertia phase is ended. Meanwhile, in a case where the variator 20 is upshifted, the decrease in the acceleration G due to a decrease in driving force occurs for an amount of the upshift of the variator 20.

Therefore, at the timing T4, a decrease in the engine torque Te at the time of ending to increase the torque, that is, a decrease in the engine torque Te for an amount of the increase in the torque is started so that the engine torque Te is gradually decreased. As well as the inclination α1, the inclination α2 is larger by an absolute value in the first example than in the second example.

Therefore, in the second example, in comparison to the first example, a state where the torque is increased is extended longer even after end of the inertia phase. The inclination α2 is set so that the acceleration G is positive in both the first example and the second example.

The timing T5 is timing at which the decrease in the engine torque Te for the amount of the increase in the torque is completed. From the timing T5 and later, the torque increase amount is zero. The timing T5 includes timing T51 in the first example and timing T52 in the second example. The timing T52 is timing later than the timing T51.

As shown between the timing T3 and the timing T5, the torque increase amount profile is a rectangular shape in the first example and a triangular shape in the second example. As a result, the acceleration G is changed to be recessed in a rectangular shape in the first example, and the acceleration G is changed to be recessed in a triangular shape in the second example. At this time, the acceleration G remains positive in both the examples. The increase in the torque of the engine 1 is ended during the torque phase, and the torque phase is ended at timing T6.

In the downshift determination of the sub-transmission mechanism 30 described above, for example, timing between the timing T2 and the timing T3, that is, timing after the deviation amount σ becomes larger than zero and before the inertia phase is started may be determined.

Such determination can be performed by determining, for example, whether or not a predetermined time set in advance elapses after the timing T2. In this case, the controller 12 can increase the torque from the timing T3 and later by, for example, inputting the created torque profile to the engine controller at the timing T3.

In order to suppress the decrease in the acceleration G, for example, it is thought that the upshift amount of the variator 20 is detected at the timing T4 and then the torque is increased. However, the decrease in the acceleration G occurs from the timing T3 at which the inertia phase is started and later. Therefore, timing after the upshift amount of the variator 20 is detected at the timing T4 is too late for the increase in the torque.

Meanwhile, the deviation amount σ can be computed in a driving state of the vehicle in which the through speed ratio Ratio_T is set. Thus, it is possible to make the timing for the increase in the torque not too late.

Next, major actions and effects of the present embodiment will be described.

The vehicle includes the transmission 4 having the variator 20 and the sub-transmission mechanism 30 which are arranged in series with respect to each other in the power transmission route connecting the engine 1 and the drive wheels 7, the controller 12 serving as the shift control portion adapted to, as the shift of the transmission 4, shift the sub-transmission mechanism 30 and the variator 20 so that the through speed ratio Ratio_T becomes the target speed ratio Ratio_T2, and the engine 1 serving as a torque increasing portion adapted to increase the torque inputted to the transmission 4 in association with the shift of the transmission 4. The controller 12 has the torque setting unit adapted to make the magnitude of the inclination α1 larger as the increase amount of the engine rotation speed Ne in association with the shift of the transmission 4 is larger.

According to such a configuration, in the context that with a larger downshift amount of the through speed ratio Ratio_T, there is a need for more largely increasing the engine rotation speed Ne, the magnitude of the inclination α1 is changed in accordance with the increase amount of the engine rotation speed Ne. Therefore, at the time of the downshift of the sub-transmission mechanism 30, by changing the magnitude of the inclination α1 in accordance with the magnitude of the possibly occurring decrease in the acceleration G, it is possible to properly suppress the decrease in the acceleration G.

The controller 12 makes the magnitude of the inclination α1 larger as the magnitude of the deviation amount σ is larger.

According to such a configuration, it is possible to properly set the timing for the increase in the torque, and it is possible to properly realize the control of making the magnitude of the inclination α1 larger as the increase amount of the engine rotation speed Ne is larger.

Upon downshifting the through speed ratio Ratio_T on the basis of the accelerator pedal pressing operation by the driver, the controller 12 ends the increase in the torque of the engine 1 on the basis of the end of the inertia phase in the sub-transmission mechanism 30.

According to such a configuration, it is possible to end the increase in the torque in time with the timing at which the decrease in the acceleration G due to the shift of the sub-transmission mechanism 30 no more occurs. As a result, in the torque phase and later, it is possible to prevent that the increase in the torque causes acceleration feel unintended by the driver.

Upon decreasing the increased engine torque Te after the end of the inertia phase, the controller 12 makes the magnitude of the inclination α2 smaller as the magnitude of the deviation amount σ is smaller.

According to such a configuration, by making the magnitude of the inclination α2 smaller in order to suppress the decrease in the acceleration G for the amount of the upshift of the variator 20 even after the inertia phase, it is possible to keep increasing the torque for a while even after the inertia phase. As a result, it is possible to suppress the change in the acceleration G at the time of switching from the inertia phase to the torque phase.

The controller 12 sets the inclination α2 so that acceleration G is positive.

According to such a configuration, it is possible not to cause the decrease in the acceleration G at the time of ending to increase the torque.

The embodiment of the present invention is described above. However, the above embodiment only shows part of application examples of the present invention and does not intend to limit the technical scope of the present invention to the specific configurations of the above embodiment.

In the embodiment described above, the case where the variator 20 is upshifted upon the downshift of the sub-transmission mechanism 30 is described. However, the variator 20 may be downshifted upon the downshift of the sub-transmission mechanism 30.

The case where the variator 20 is downshifted upon the downshift of the sub-transmission mechanism 30 is, for example, a case where speed ratio width of the transmission 4 due to pressing of the accelerator pedal by the driver is larger than speed ratio width of the sub-transmission mechanism 30. The case where the variator 20 is upshifted is, for example, a case where the speed ratio width of the transmission 4 due to the pressing of the accelerator pedal by the driver is smaller than the speed ratio width of the sub-transmission mechanism 30.

In this case, for example, the controller 12 can also make the magnitude of the inclination α1 smaller in the case where the variator 20 is upshifted than in the case where the variator 20 is downshifted upon the downshift of the sub-transmission mechanism 30.

According to such a configuration, by changing the magnitude of the inclination α1 between the case where the variator 20 is downshifted and the case where the variator 20 is upshifted, it is possible to properly increase the torque, and thereby, it is possible to property suppress the decrease in the acceleration G. Specifically, by making the inclination α1 gentler in the case of the upshift than in the case of the downshift, it is possible to increase the torque, matching with the decrease in the acceleration G possibly occurring in the case of the upshift.

In the embodiment described above, the case where the engine 1 forms the travel drive source is described. However, the travel drive source can be formed by, for example, at least any of an engine and a motor.

In the embodiment described above, the case where the engine 1 serving as the travel drive source also serves as the torque increasing portion is described. However, the torque increasing portion may be formed by, for example, a drive source which is different from the travel drive source.

In the embodiment described above, the case where the controller 12 is formed as a control device for the vehicle is described. However, the control device for the vehicle may be formed by, for example, plural controllers.

The invention claimed is:

1. A control device for a vehicle including at least one controller, the control device being adapted to perform control in the vehicle having:
   a transmission having a variator and a stepped automatic transmission mechanism which are arranged in series with respect to each other in a power transmission route connecting a travel drive source and a drive wheel;
   the at least one controller adapted to, as a shift of the transmission, control the transmission to shift the stepped automatic transmission mechanism and the variator so that a speed ratio of the transmission becomes a target speed ratio; and
   a torque increasing portion adapted to increase torque inputted to the transmission in association with the shift of the transmission, the torque increasing portion corresponding to the travel drive source or another drive source, wherein
   the at least one controller is adapted to make an increase degree of the torque inputted to the transmission larger as an increase amount of rotation speed of the torque increasing portion in association with the shift of the transmission is larger, the at least one controller making the increase degree of the torque inputted to the transmission larger as a deviation amount between a reached speed ratio of the transmission and the target speed ratio is larger, the reached speed ratio being set in accordance with vehicle speed and an accelerator pedal opening and the target speed ratio serving as the reached speed ratio after filtering processing.

2. The control device for the vehicle according to claim 1, wherein
   upon downshift of the stepped automatic transmission mechanism, the at least one controller makes the increase degree of the torque inputted to the transmission smaller in a case where the variator is upshifted than in a case where the variator is downshifted.

3. The control device for the vehicle according to claim 1, wherein
   upon downshifting the speed ratio of the transmission on a basis of an acceleration request, the at least one controller ends an increase in the torque inputted to the transmission on a basis of an end of an inertia phase in the stepped automatic transmission mechanism.

4. The control device for the vehicle according to claim 3, wherein
   upon decreasing the increased torque inputted to the transmission after the end of the inertia phase, the at least one controller makes a decrease degree of the torque inputted to the transmission smaller as the deviation amount is smaller.

5. The control device for the vehicle according to claim 4, wherein
   the at least one controller sets the decrease degree so that vehicle front-rear acceleration is positive.

6. A control method for a vehicle having:
   a transmission having a variator and a stepped automatic transmission mechanism which are arranged in series with respect to each other in a power transmission route connecting a travel drive source and a drive wheel; and
   a torque increasing portion adapted to increase torque inputted to the transmission in association with a shift of the transmission, the torque increasing portion corresponding to the travel drive source or another drive source,
   the control method for the vehicle in a case where, as the shift of the transmission, the stepped automatic transmission mechanism and the variator are shifted so that a speed ratio of the transmission becomes a target speed ratio by controlling the transmission,
   the control method comprising:
   making an increase degree of the torque inputted to the transmission larger as an increase amount of rotation speed of the torque increasing portion in association with the shift of the transmission is larger; and
   upon making the increase degree of the torque inputted to the transmission lager, making the increase degree of the torque inputted to the transmission larger as a deviation amount between a reached speed ratio of the transmission and the target speed ratio is larger, the reached speed ratio being set in accordance with vehicle speed and an accelerator pedal opening and the target speed ratio serving as the reached speed ratio after filtering processing.

7. A control device for a vehicle, the control device being adapted to perform control in the vehicle having:
   a transmission having a variator and a stepped automatic transmission mechanism which are arranged in series with respect to each other in a power transmission route connecting a travel drive source and a drive wheel;
   shift control means for controlling the transmission to shift shifting the stepped automatic transmission mechanism and the variator so that a speed ratio of the transmission becomes a target speed ratio as a shift of the transmission; and
   a torque increasing portion adapted to increase torque inputted to the transmission in association with the shift of the transmission, the torque increasing portion corresponding to the travel drive source or another drive source,
   the control device comprising:
   torque setting means for making an increase degree of the torque inputted to the transmission larger as an increase amount of rotation speed of the torque increasing portion in association with the shift of the transmission is larger, wherein
   the torque setting means make the increase degree of the torque inputted to the transmission larger as a deviation amount between a reached speed ratio of the transmission and the target speed ratio is larger, the reached speed ratio being set in accordance with vehicle speed and an accelerator pedal opening and the target speed ratio serving as the reached speed ratio after filtering processing.

* * * * *